US008655694B2

(12) United States Patent
Boudville

(10) Patent No.: US 8,655,694 B2
(45) Date of Patent: Feb. 18, 2014

(54) DYNAMIC GROUP PURCHASES USING BARCODES

(76) Inventor: Wesley John Boudville, Perth (AU)

(*) Notice: Subject to any disclaimer, the term of this patent is extended or adjusted under 35 U.S.C. 154(b) by 0 days.

(21) Appl. No.: 13/506,957

(22) Filed: May 29, 2012

(65) Prior Publication Data

US 2013/0325524 A1 Dec. 5, 2013

(51) Int. Cl.
*G06Q 10/00* (2012.01)
(52) U.S. Cl.
USPC ............................................. 705/5; 705/1.1
(58) Field of Classification Search
USPC ........................................................ 705/5, 1.1
See application file for complete search history.

(56) References Cited

U.S. PATENT DOCUMENTS

| | | | |
|---|---|---|---|
| 5,726,435 A | 3/1998 | Hara | |
| 6,115,508 A | 9/2000 | Lopresti | |
| 6,134,534 A * | 10/2000 | Walker et al. | 705/5 |
| 6,631,012 B2 | 10/2003 | Athens | |
| 7,287,696 B2 | 10/2007 | Attia | |
| 7,478,746 B2 | 1/2009 | Cattrone | |
| 7,822,688 B2 | 10/2010 | Labrou et al. | |
| 7,882,653 B2 | 2/2011 | Barlow | |
| 8,186,572 B2 | 5/2012 | Herzig | |
| 8,261,993 B2 * | 9/2012 | Rathus et al. | 235/472.01 |
| 2004/0117275 A1* | 6/2004 | Billera | 705/28 |
| 2005/0187873 A1 | 8/2005 | Labrou et al. | |
| 2007/0250847 A1* | 10/2007 | Gastwirth | 725/13 |
| 2008/0270219 A1* | 10/2008 | Antinori | 705/10 |
| 2010/0114680 A1* | 5/2010 | Steelberg et al. | 705/14.4 |
| 2010/0228632 A1 | 9/2010 | Rodriguez | |
| 2011/0271295 A1* | 11/2011 | Redmann et al. | 725/13 |
| 2012/0044571 A1 | 2/2012 | Mukawa | |
| 2012/0078667 A1* | 3/2012 | Denker et al. | 705/5 |
| 2012/0095749 A1 | 4/2012 | Capretta | |
| 2012/0190386 A1* | 7/2012 | Anderson | 455/456.3 |
| 2013/0246155 A1* | 9/2013 | Kandanala et al. | 705/14.35 |

FOREIGN PATENT DOCUMENTS

| | | |
|---|---|---|
| JP | 2003-006080 | 1/2003 |
| JP | 2006-107368 | 4/2006 |
| JP | 2007-527062 | 9/2007 |
| KR | 10-2006-0054591 | 5/2006 |
| KR | 10-2008-0030989 | 4/2008 |

OTHER PUBLICATIONS

Wheeler, Judd, "Mobile Barcodes (QR Codes/ Microsoft Tag) in Movie Advertising", Sep. 6, 2011.*
PCT International Search Report mailed on Mar. 18, 2013 for PCT/US2012/063437 filed on Nov. 2, 2012 in the name of Boudville Wesley.

(Continued)

*Primary Examiner* — Shannon Campbell
(74) *Attorney, Agent, or Firm* — Steinfl and Bruno Ltd

(57) ABSTRACT

A movie theatre shows a barcode on an electronic screen separate from the projection screen, on a side wall of the movie room. The barcode lets a patron buy tickets to movies shown in trailers on the projection screen. The patron uses a mobile device, like a cellphone, to image the barcode and decode an URL to a web page. The electronic screen also shows a table of ticket purchases, with thresholds allowing for discounted prices. The purchases are mostly from patrons in the theatre, but could also include from patrons at other theatres seeing the same trailers. This allows dynamic group purchasing of tickets in an interactive feedback loop.

15 Claims, 2 Drawing Sheets

(56) References Cited

OTHER PUBLICATIONS

PCT Written Opinion mailed on Mar. 18, 2013 for PCT/US2012/063437 filed on Nov. 2, 2012 in the name of Boudville Wesley.

U.S. Appl. No. 13/374,207, filed Dec. 16, 2011, Boudville.
U.S. Appl. No. 13/200,849, filed Dec. 14, 2011, Boudville.
U.S. Appl. No. 13/136,232, filed Jul. 28, 2011, Boudville.
U.S. Appl. No. 13/068,782, filed May. 16, 2011, Boudville.

* cited by examiner

DYNAMIC GROUP PURCHASES USING BARCODES

REFERENCES CITED

"Service-Oriented Architecture" by T. Erl, Prentice-Hall (2004), 013-1428985.
"Understanding GPS" by E. Kaplan et al, Artech House (2005), 15805-38940.
"Two-dimensional color barcode and method of generating and decoding the same" by P. Cattrone, U.S. Pat. No. 7,478,746 (2009).
"System and method for decoding and analyzing barcodes using a mobile device" by O. Attia et al, U.S. Pat. No. 7,287,696 (Oct. 30, 2007).
"Mobile billboard advertising system and apparatuses" by E. Barlow, U.S. Pat. No. 7,882,653 (May 31, 2005).
"Apparatus and method for printing two-dimensional barcode and articles incorporating such barcode" by G. Athens et al, U.S. Pat. No. 6,631,012 (2003).
"Clock free two-dimensional barcode and method for printing and reading the same" by D. Lopresti et al, U.S. Pat. No. 6,115,508 (2000).
"Optically readable two dimensional code and method and apparatus using the same" by M. Hara et al, U.S. Pat. No. 5,726,435 (1998).
"Multi-functional audio distribution system and method for movie theaters and other public and private venues" by A. Capretta, US Patent Application 20120095749 (Oct. 13, 2011).
"Display apparatus" by H. Mukawa, US Patent Application 20120044571 (Aug. 11, 2011).
"Colour barcodes and cellphone" by W. Boudville, U.S. patent application Ser. No. 13/374,207 (Dec. 16, 2011) ("207").
"Barcode and cellphone for anonymity and privacy" by W. Boudville, U.S. patent application Ser. No. 13/200,849 (Oct. 4, 2011), ("849").
"Using dynamic barcodes to send data to a cellphone" by W. Boudville, U.S. patent application Ser. No. 13/136,232 (Jul. 28, 2011), ("232").
"Cellphone changing an electronic display that contains a barcode" by W. Boudville, U.S. patent application Ser. No. 13/068,782 (May 16, 2011), ("782").
"Narrowcasting from public displays, and related methods" by T. Rodgriguez, US Patent Application 20100228632 (Mar. 3, 2010).
"Method and system for monitoring a display venue" by W. Redmann et al, US Patent Application 20110271295 (Nov. 4, 2009).
"On-site barcode advertising" by R. Steelberg et al, US Patent Application 20100114680 (Oct. 1, 2009).
[The Web references are as of May 2012]
groupon.com
livingsocial.com
panasonic.com
samsung.com
sharp.com
sony.com
en.wikipedia.org/wiki/Closed_captioning
en.wikipedia.org/wiki/Mobile_billboard
en.wikipedia.org/wiki/QR_code
en.wikipedia.org/wiki/Voip
en.wikipedia.org/wiki/WiFi

TECHNICAL FIELD

This submission relates to the use of a cellphone to buy tickets to movies shown in trailers at a movie theatre.

BACKGROUND

Often before a movie screening, trailers of future movies will be shown. This is generally considered the best way to advertise a future movie. First, the audience has shown by its presence that it is willing and able to pay to go to a theatre. Second, the immersive effect of the large screen and the attendant sound system is more effective than television ads or billboards or other traditional means in conveying an anticipated future viewing experience. This is especially germane because of the increasing effectiveness of various automatic ad skipping methods for television. Hence while any type of ads could be shown in the theatre before the main screening, in practice these are mostly movie trailers.

But a perennial problem for the theatre and the studios has been how to quantify this presentation of trailers. Traditionally, before the prevalence of cellphones, the patron would have to leave the theatre at the end of the movie, remember the trailers and later decide to go to a theatre, and not necessarily the same theatre chain, to buy a physical ticket to a movie she saw in a trailer. To simplify this for her, some theatres offer a means of buying electronic tickets on the Internet. She can do this from her home computer or mobile device. But when she does so, the theatre does not know in general that she has been influenced by seeing a trailer. It might ask her in the web page where she places her order, but she might decline to answer. Also, by putting extra items in a web page or sequence of web pages, this has the risk of confusing the visitor and thus lessening the chance that she successfully completes a purchase.

Even if she were to use her cellphone to buy a ticket while in the theatre watching the trailer, it is noteworthy that the theatre usually will not know that she is in the theatre. Its web server will see an Internet address for a web query (that originated from her device). But that address might be a temporary one dynamically assigned by her wireless provider from a set of addresses owned by the provider. Or, on the Internet network, the query might originate from the wireless provider's gateway machine, that sits on both the Internet and the provider's internal network. Any geographic data publicly accessible and associated with that Internet address will be a location of the wireless provider. In general, that location will likely be somewhere in the same city of the theatre.

In principle, the theatre could try to address this by its web server knowing accurately the times at which it has shown trailers. When it gets an Internet purchase for a movie during or soon after its trailer was shown, it might infer that the buyer was in the theatre. But often the web server is for all the theatres in that theatre chain. And each theatre could be a multiplex, with several screens. For this to be tried, the chain needs accurate temporal records of all its screenings.

Readers may note that the lack of ability to measure the effectiveness of trailers is common to most traditional forms of ads, like those in magazines, billboards and television.

SUMMARY

A movie theatre shows a barcode on an electronic screen separate from the projection screen, on a side wall of the movie room. The barcode lets a patron buy tickets to movies shown in trailers on the projection screen. The patron uses a mobile device, like a cellphone, to image the barcode and decode an URL to a web page. The electronic screen also shows a table of ticket purchases, with thresholds allowing for discounted prices. The purchases are mostly from patrons in the theatre, but could also include from patrons at other theatres seeing the same trailers. This allows dynamic group purchasing of tickets in an interactive feedback loop.

Closed captioning (subtitle) information can also be accessed on the patron's cellphone in a similar way, via the use of a barcode visible to patrons inside the movie theatre room.

A mobile electronic billboard can be used to offer items for sale to a crowd in a public place. The use of a barcode on the billboard lets a person buy an item. And the billboard showing item purchases also permits interactive dynamic group purchasing.

DETAILED DESCRIPTION OF THE PREFERRED EMBODIMENT

What we claim as new and desire to secure by letters patent is set forth in the following claims.

Figure 1:
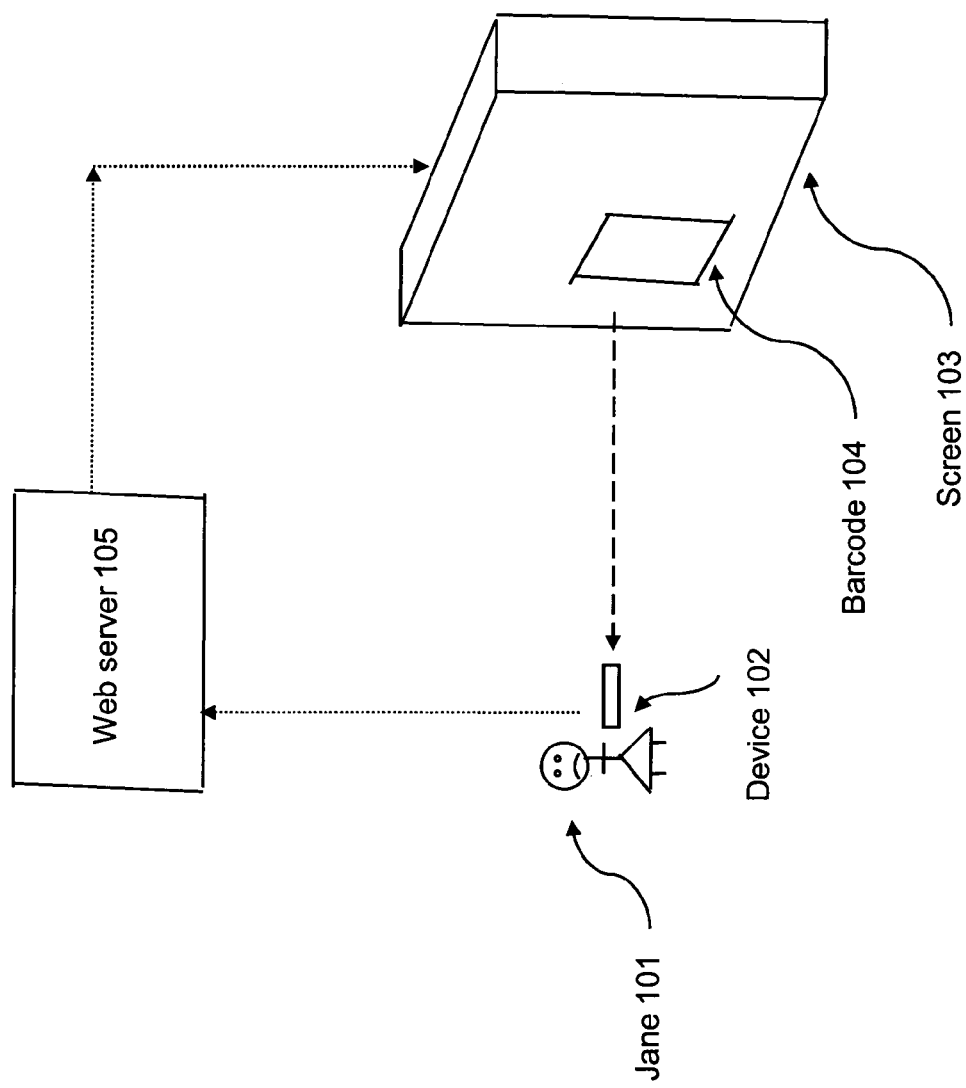
FIG. 1 shows a user Jane with a mobile device at a screen showing a video.

The submission has the following sections—
1. Base implementation;
2. Electronic screen;
3. Dynamic group purchases;
4. Non-movie trailers;
5. Mobile electronic billboard;
6. Closed caption;
7. Extensions;

1. Base Implementation;

Consider FIG. 1. It shows a user, Jane 101, holding a mobile device, Device 102. She is inside a movie theatre, and is looking at Screen 103, which is showing some video content. She can be standing or sitting, though likely she will be sitting. By 'mobile device', we mean a mobile, electronic communication device, where the communication is by wireless means. A common instantiation of a mobile device is a cellphone. Here, the term 'cellphone' includes the case of a smartphone. Other mobile devices include a laptop, netbook, electronic book reader or tablet.

Screen 103 is, in general, not the projection screen on which the movie will be shown. Though it could be. Typically it might be on the left or right walls, relative to the projection screen. Screen 103 has Barcode 104 on it. There might be other images on Screen 103. Barcode 104 might be in one of various barcode formats, like QR or Data Matrix. Barcode 104 wraps an URL that points to Web Server 105, which is, in general, in a different location than the theatre. Jane uses Device 102 to take an image of Barcode 104. Device 102 has software that decodes the image, sees that it is in the format of an URL, opens a web browser and loads it with that URL. It is assumed that Device 102 has wireless Internet access. Web Server 105 is connected across the Internet to Screen 103. When Web Server 105 gets the query from Device 102, it returns a web page to Device 102, which is the normal action of any web server. But, and this is distinctive, it can send some data to affect or control the display of Screen 103. We say 'affect' because in some instances Screen 103 might take other types of inputs, or it might use an internal random number generator to aid in determining an image that it will show. Below, we will often say for brevity that Web Server 'controls' Screen 103. But the preceding remarks about 'affect' should be also taken into consideration.

Jane's initial taking of the image of the barcode could cause a change in the overall image on Screen 103. While if she then performs some action on the web page, where this involves or ends in a pressing of a link or button on the page that sends data to Web Server 105, this can also cause changes in Screen 103. Hence we have an interactive feedback loop.

For simplicity, we omitted in FIG. 1 the explicit existence of a controller computer near or part of Screen 103, that computes and sends the display data to Screen 103. When we say Screen 103, we implicitly conflate the presence of this controller in it.

The hardware of Screen 103 could be an electronic screen sold by manufacturers like Samsung Corp., LG Corp., Sharp Corp. and Panasonic Corp. The controller of Screen 103 might be a variety of computers, desktop or laptop. If Device 102 is taken to be a cellphone, this could include models made by Apple Corp., including its iPhone™, or models by Samsung Corp. or Nokia Corp.

The hardware instantiated by Web Server 105 is made by a variety of companies, with microprocessors from, for example, Intel Corp. or ARM Corp. The web server software might be open source, for example Apache™, or various proprietary implementations. In general, the software will be modified for the purposes of this submission. Largely, it can be appreciated that the hardware is Commercial Off The Shelf (COTS), which helps in reducing the cost of an implementation.

Our submission offers the following advantages over the current state of the art of how theatres sell tickets. First, it would be advantageous for the movie theatre to enable more ticket purchases from patrons while they are in the theatre. Second, by being able to objectively as possible associate such sales with trailer screenings, it could help the studios measure the efficacy of these vis a vis other types of advertising like television and billboards. Third, a studio might have several trailers for a movie, which emphasise different aspects to appeal to different audiences. Traditionally, the studio might hire focus groups to show the versions to, in order to try to find optimal versions. Instead, if a theatre could associate a given trailer with specific sales, and do this across all trailers, it would be important pre-release data to the theatre and studio.

Consider the display of a barcode in the theatre room. Preferably, it would be shown on the side walls. There might be several instances of the barcode. This is Barcode 104 in FIG. 1, where for now it might be shown as hardcopy or on an electronic screen. The former can be considered a special case of FIG. 1, where Screen 103 is the hardcopy material, and there is no connection from Web Server 105 to it.

The barcode encodes an URL of the theatre Web Server 105. The URL might present a web page with 2 choices. One is for hearing impaired and goes to a closed caption page. (See section 6.) The other is for everyone with a suitable mobile device. It leads to a page where the patron can buy electronic tickets to those movies. The page might also have a poll asking her opinions of those trailers. The use of the barcode is easier than having an URL being written on a display and the patron having to manually type it into her device. Especially in a dimly lit theatre, even if her device has self lighting for its keyboard.

A variant is where there are 2 different barcodes. One goes to a closed caption page. The other goes directly to a page offering trailer tickets. In the rest of this section, we assume the second case for simplicity.

Some trailers are for movies whose release dates have not yet been finalised. The theatre and studio might cooperate in offering tickets for sale, where the tickets could be for a range of dates.

Note that if a trailer is shown in the theatre, it does not mean that there must be tickets available for purchase via this method. Some trailers might opt out of this method.

A variant on the above of buying an electronic ticket is where the patron is offered the choice of buying a physical ticket when she leaves the theatre foyer. This could be done by her getting an electronic receipt on her device. She shows this when exiting, to an appropriate employee who might have a scanner that can verify it and present her with a physical ticket. The electronic receipt might be in the form of a barcode, similar to the barcodes used elsewhere in this submission.

Since the theatre is likely part of a chain of theatres, the geographic distribution of purchases and poll results can also be valuable. Typically, the theatre chain, perhaps in conjunction with the studios, has to estimate at which of its theatres to show future movies and for how long. The data from the above activities can aid in these decisions.

The method is also useful because the patron has to take the initiative to scan the barcode. Less intrusive than other methods that, for example, try to detect the presence of a cellphone user in some neighbourhood and then send an email or SMS or Bluetooth message about a shop in that area having a special offer. By default in our submission, the user has to opt-in instead of opt-out. The patron scanning the barcode is taken by us to imply an opt-in.

The URL in the barcode might have in the string after its domain name an entry like "i=15&j=2". The i is an index of the theatre amongst all theatres in that chain. The j is an index of the screen in that theatre, since the latter might be a multiplex. The combination of these indices tells the theatre Web Server 105 when it gets a query from the patron's device, of the specific screen that the patron is seeing. Clearly, the indices could be combined, as an alternative formulation. We use 2 indices for pedagogic reasons of clarity.

During the time that the hardcopy barcode is visible, the server can correlate only with all the trailers shown on that screen. In the absence of information about when each trailer appeared. Thus if there are several trailers for a given movie, only one of these might be shown in that screen over that time period of a constant hardcopy barcode, and other versions should be shown in different screens, in order for the server to quantify purchase responses to the versions.

2. Electronic Screen;

Now suppose the barcode appears on an electronic display. We have the full implementation of FIG. 1. The barcode can change for each session. In the barcode URL there could now be an extra index, say "k", unique to a session. So the 2 pm movie screening has for example "k=83", the 5 pm screening has "k=84", the 8 pm screening has "k=85" etc. Here, we just chose the simple case of having the index increment to track each session. The incrementing could continue into the next day. An alternative might be a random value generated for each session. In any case, index values might be generated to be unique for the given screen over some extended time period, like one year.

Earlier, we described how the i and j indices could be combined into one index. Likewise the k index could be combined with those two into one index. These are all equivalent formulations. Note also that the URL might have other information.

Web Server 105 controls Screen 103. When a new movie session starts, Web Server 105 updates the display with the appropriate new barcode that wraps the corresponding new session URL. This could be done before any patrons are admitted into the room.

The session index is a proxy for a time stamp. It is simpler and preferable to encoding a time stamp into the URL. Similar to the header packet in an Internet Protocol message, which uses a counter as a proxy for a time stamp. In the early years of the Internet, it was planned to use a time stamp in the message packets. This proved unwieldy due to difficulties in synchronising clocks on different computers. Learning from this, here the use of the session index simplifies the data synchronisation for the server. It just has to know the trailers and movie for each session, without having to know, down to the minute, for example, when each trailer was shown.

The theatre now has a set of high precision URLs. Each has what may be termed an "active" lifetime, during its movie session. But it is important to note that the URLs should still point to valid web pages for ticket purchases after those sessions have ended. One reason is that the patron might bookmark a session URL and later go to it to make a purchase, after she has left the theatre. Another reason is that she might email this to her friends, recommending its movie, or one or more of the movies in the web page, if the latter refers to several movies. In these cases, the server can still associate a purchase with a given session and thus with the contents of which trailers or main movie were shown in that session.

Even when a movie that has been pointed to by a trailer is no longer shown, an URL made to originally point to a purchase page should still have valid content. This might list other movies currently showing or that will be shown, to induce the visitor to buy.

The above use of a barcode on an electronic screen can be approximated by printing hardcopies of the barcodes unique to each session, and having the ushers put these on the walls prior to the session. It can be appreciated that this is cumbersome.

The order in which the trailers appear on the main screen might now have extra significance. Suppose after or during the first trailer, a barcode becomes visible, to let a patron buy a ticket to the trailer, when the impressions of the trailer are at their strongest. The web page for this might or might not show a list of all the trailers to be shown on the main screen in this session. In either case, there could be a tendency for a patron enthusiastic about the first trailer to buy tickets to it. This diminishes her ability to buy tickets to the other trailers. Likewise the second trailer could statistically reduce the chances of purchases for later trailers. This could be tested empirically by, for example, varying the order of the first and second trailers on several screens and across several sessions and different theatres.

This possible preference for an early position in the list of trailers shown on the main screen could be in opposition to a probable existing preference for a trailer to go later. With the presumed best trailer position being just before the movie starts. Since the audience size increases during the trailer displays.

The theatre might have different methods to resolve this. First, it might not consider this to be a problem. Second, it might levy a fee on a studio that wants its trailer to be placed in a particular position. Third, it might randomly vary the trailer order for all its screens. There might be other methods.

Another issue is the knowledge about the order of trailers. Currently patrons are not generally told this beforehand. A possibility now exists that when the web page appears for the first trailer, it lists the trailers to be shown, as mentioned above. The order could be the same as the order in which they will appear on the screen. The making available of the trailer list as early as possible maximises the time in which purchases can be made.

3. Dynamic Group Purchases;

If the barcode appears on an electronic screen, other data could be shown, to create an interactive feedback loop with the patrons. One example of how to encourage the interactivity and (hopefully) purchases is via dynamic group purchasing. The price of a ticket to a future movie whose trailer was shown might be a function of the response of the audience. If the number of buyers rises above some threshold, then the ticket price might fall. By displaying on the screen the current total of tickets bought in this movie session, and showing the threshold, this could act in part as a gaming environment. The intent is to induce a collective cooperative response by the audience.

This is aided by the decades long practice of theatres often selling matinee tickets at cheaper prices than evening tickets. Patrons have been conditioned to expect a price difference for what is intrinsically essentially the same experience.

Figure 2:
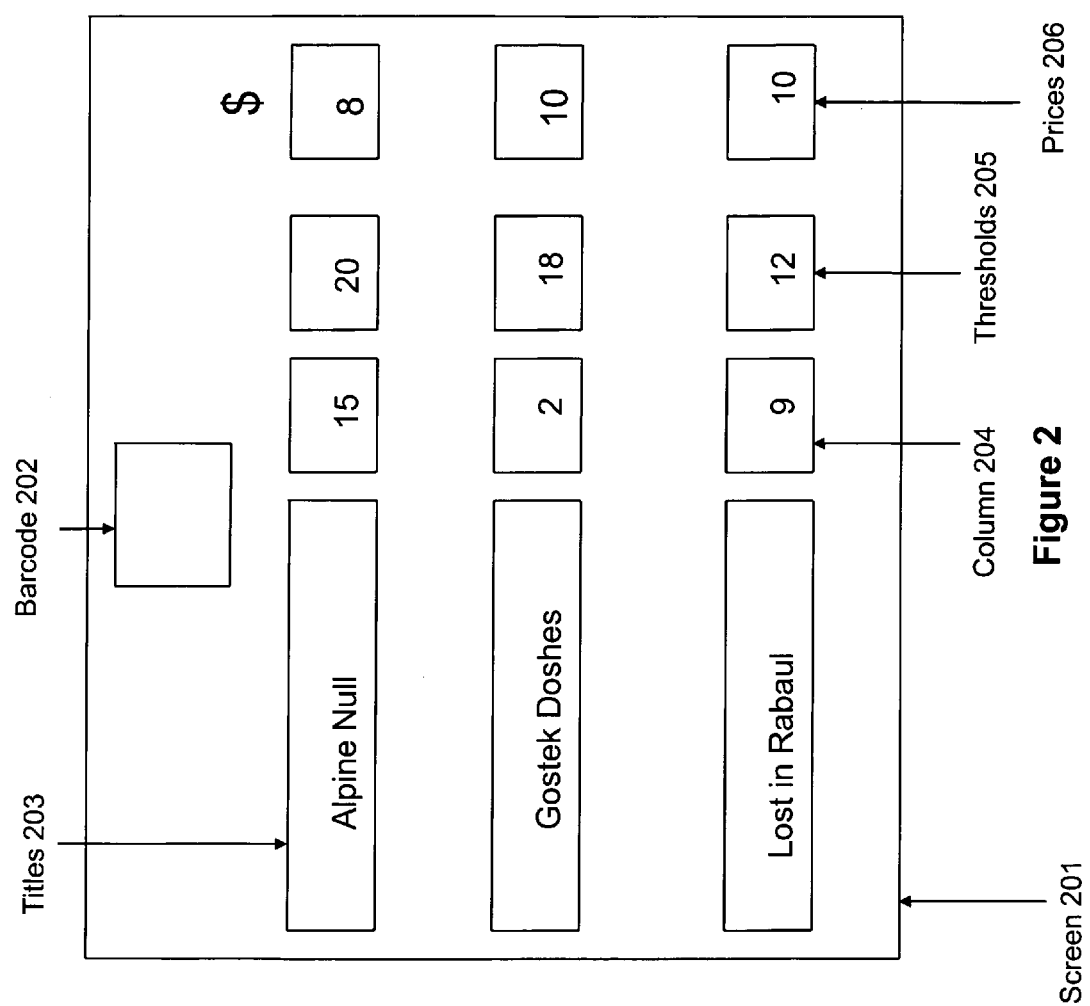
FIG. 2 shows a screen in a theatre with a barcode and a table of trailers shown and tickets purchased.

FIG. 2 shows an example. Screen 201 is an electronic screen which could appear on one or more of the side walls of the theatre room. Barcode 202 lets the patron get a top level web page from which to get closed captioning or to order tickets. Titles 203 is the list of trailers that have been or possibly have yet to be shown in this room. Column 204 is the number of tickets bought in this room by the patrons currently in it. Thresholds 205 are the thresholds of the number of tickets for a movie. At or above this value, the price per ticket would fall. Prices 206 are the current prices to buy a ticket.

Other implementations of Screen 201 might have fewer or more columns. And the content of the columns could differ from FIG. 2. In general, the number of columns should be minimal and their meanings kept as obvious as possible, to reduce the cognitive load on a patron who might not have seen or used such a method before.

Some or all of the information in the table of FIG. 2 could also be shown on the patron's browser. The latter might also have more information, some of which could be specific to that patron. A major reason for making Screen 301 visible to the entire audience is that the group discount effect can encourage those who have not imaged the barcode to do so, to buy tickets and thus push down the price they pay.

It is stressed that the tabular format of FIG. 2 is one example only. There could be another Graphical User Interface, for one or both of the screen in FIG. 2 and the patron's web page. A GUI designer might want to emphasise or enable a more game-like interface, or to have a more dynamic form for what the user sees.

The interactive effect might extend to the theatre showing on the main projection screen text and graphics, possibly accompanied by audio from the theatre's speakers, promoting ticket purchases. The text or audio might declaim, for example, "Hurry. Buy your tickets NOW for cheap prices!"

FIG. 2 might have 2 barcodes. One leads to a closed caption page. The other to a page to buy tickets (or rate a trailer).

Screen 201 shows only 3 rows of movie titles. There could be more rows or less rows. If more movies are to be listed than there are rows, then the list might be scrolled regularly, so that all the trailers are visible over time. A variant of Screen 201 has no Barcode 202. Instead, the latter is shown on a separate display; perhaps by itself. This display might be electronic or hardcopy.

A variant of Screen 201 is where the barcode or barcodes are shown in alternating fashion with the table. This lets the barcode be shown in larger size, which makes it easier for a patron to resolve it with her device's camera.

Screen 201 might show a time limit for the group buying. This could take the form of an image of an analog or digital clock ticking down. This might be an extra inducement to encourage purchases.

Screen 201 could use other time varying graphics to highlight or emphasise various aspects. For example, a text overlay might temporarily appear in a large size font, saying "Buy 2 more tickets to [movie name] for lower prices!". The threshold column might also take a different form. It could show the number of extra purchases needed to reach the threshold. A 'countdown' display that could be considered easier for some patrons to grasp.

Another example is where actual graphs are used. For example, there could be a 2 dimensional graph. The horizontal axis is time. Starting with the start of the current session, when people were admitted into the movie room. The vertical axis could be the number of purchases. The graph could show the latter as a function of time. There could be several lines, in different colours or line styles (like continuous or dash or dash and dot) or both, for each trailer. The graph could also show horizontal lines, at different vertical coordinates. These are the thresholds. Hence a patron could easily see the time history of the audience's purchases and how far away the next thresholds are for each trailer. This graph could be shown on the mobile device's web page, possibly as an alternative view, where the patron could toggle between this and the tabular format. It could also be shown on Screen 201. For the latter, there might be some automated toggling between this graphic and the tabular format.

More generally, partial control of how data is shown on Screen 201 could be delegated to the patrons who have imaged the barcode and obtained web pages on their devices. On those pages could be an option to suggest the showing of data in other formats, pre-determined by the server. The default could be the tabular format of FIG. 2. But there could be other formats, tabular and graphical. There might be a web page that lets patrons pick one or more of these and upload these choices to the server. Then the server could tally these obtained over some time interval, and use as partial input in deciding to show in only one format or to alternate between several popular formats.

A purchase policy in Screen 201 could be that when the patron places the buy, the price is not yet determined. But will be set at some nearby future time, like when the main movie starts. Here, the Prices 206 column designates the current prices, not the final prices. The patrons known that the latter will not be higher than the former. This lets all buyers benefit from the lowest ticket price. It also removes any incentive for a buyer to wait to the last possible moment to place an order.

A very practical benefit is that it avoids some early buyers having regrets about placing their orders too soon, when they were charged higher prices than a current buyer would be. For our feedback to be optimal, we need liquidity in this (small) marketplace. So we need patrons to not be averse to placing the initial purchases, which then appear on the table in Screen 201, to act as incentive for others to buy.

A variant of the previous statements is where the time limit is extended if enough extra purchases occur to, say, reach a price threshold. This is akin to a traditional auction, where the auctioneer is going to stop an auction but another higher bid comes in, so he extends the auction. In this submission, a novelty is that our equivalent of the higher bid is extra purchases that produce a lower unit price.

The threshold for discounted prices might vary with the choice of future movie. It could also be a function of how many people are currently in the audience. So in a theatre that is half full, the threshold might be less than in an almost full theatre. This makes meeting the threshold more feasible in the former case.

The theatre could set the threshold before each session by knowing how many tickets it has sold for that session (physical and electronic tickets) on previous days. Or it could just approximate, by using heuristics like a lower value for matinees compared to evening sessions.

Instead of using a threshold customised for each movie as shown in FIG. 2, there might be a standard threshold, across all the movies. This has the advantage of eliminating the Thresholds 205 column and simplifying the figure. As earlier, the value of the standard threshold might be made available through the web pages on the patron's device.

The above discussed one purchase threshold per movie listing. There could be several such thresholds per movie. When the lowest has been reached, the price per ticket is lowered. If more tickets are purchased, reaching the second lowest threshold, then the price per ticket might be lowered again. This could be done for all tickets for that movie, as suggested above. The idea behind the use of multiple thresholds (and corresponding lower prices) is to induce more purchases that are still cast effective for the theatre on a net basis, after accounting for the lower prices it obtains on these tickets.

If there are several thresholds per movie, FIG. 2 might in some implementations have an extra column. This could show the next (lower) price if the next (higher) threshold of ticket purchases is reached. Or this column might be merged into the Thresholds column. The next threshold and the corresponding ticket price might be shown in time alternating fashion.

The above discussed the use of threshold pricing to spur a collective social or group dynamic. A variant is to omit the use of thresholds entirely by just having a fixed price for a ticket. This fixed price might be the standard ticket price or be already some discount to that price. To encourage purchases, prizes could be offered. Conceptually, these would be in some other dimension than directly money. For example, vouchers (electronic or paper) for discounts on the food purchases in the theatre lobby. Or discounts of purchases of items sold by nearby retailers. This gives the theatre the prospects of also deriving revenue from retailers by offering a sales channel to them. Here, thresholding could also be done. For example, if the number of purchases of tickets to a movie rises above some amount, then the duration of time for which a time-limited voucher could be used is extended.

The various strategies above can be tested in a scientific manner using the methods of this submission. This includes testing a strategy in one or more movie sessions, at one or more theatres, while also having control groups where the strategy does not happen. This can be extended to the incremental deployment of this submission across a set of theatres in a theatre chain. While the back end development of the web server to handle the steps in this submission is a fixed cost, the front end consists of deploying screens (or hardcopy barcodes) to the movie rooms. The front end can be rolled out in some rooms, and the results measured to quantify any gains in purchases, and to decide on whether to expand the roll out.

Note that since purchases are made via a patron's mobile device, the web pages on the latter can have more details about various restrictions or multiple thresholds than can be easily shown on Screen 201. This helps keep the contents of Screen 201 minimal.

If an URL to a purchase page is used after the movie session, then the theatre can set its policy as to whether or not the ticket price will be the discounted one achieved during the session.

The contents of Screen 201 might be visible not just before the main movie, but during the entire session.

Screen 201 might also show an entry for the main movie. The intent here is for a patron who likes this movie to be able to buy tickets to future screenings of it; for herself or as gifts to others.

The tickets bought in this method could be for that particular theatre building, or for other locations of the theatre chain. A patron would preferably be able to buy more than one ticket.

The tickets that are dynamically priced, or even those at fixed price, might be to future sessions where typically the theatre has low turnout. Like many matinee sessions. For these, if a seat is unfilled, that revenue is forever lost to the theatre. Hence there could be a high profit margin to filling those seats.

One exception might be for tickets to the opening night or opening weekend of a movie. If it is expected that a movie will be popular, the theatre might not offer discounted tickets. Instead, the attraction could be to reserve tickets for those opening sessions. Here an advantage to the patron would be the guarantee of obtaining tickets, as well as avoiding the queues during the opening.

More generally, there could be marketing information extractable from web requests that come from URLs that can be associated with a given screen and time period. Even if the requests do not result in purchases.

A variant of FIG. 2 is where instead of Barcode 202, there are barcodes by each row. So a patron imaging one of these will go directly to a web page for buying a ticket to the corresponding movie.

Above we explained how a studio could use the server data to experiment with the effectiveness of different trailers for one of its movies. Another type of experiment involves the theatre varying the order of trailers for different movies to find an order that generates the maximal revenue. Where this could include the absence of any trailers for specific movies. This now becomes an easily testable hypothesis.

More broadly, the method of this submission is akin to being able to test how different web pages for, say, selling the same item, can be effective, using web traffic data.

Above, we discussed the group purchasing for patrons in one movie room. Suppose the theatre chain has several movie rooms, perhaps in different theatre buildings, that are showing the same trailers in a synchronised manner. Here the synchronisation might only need to be accurate to within the same movie session. For example, the trailers are the same for the 2 pm session across a set of movie rooms. Then FIG. 2 might be for total purchases for each movie, made in that set of rooms. The web server controlling the screens in all the rooms has access to the purchase requests. It can tally these up across the set of rooms and display the totals in the rooms' screens in the feedback manner that was earlier restricted to one room.

One reason for the theatre to implement the previous paragraph could be when several of the rooms have sparse audiences. The use of group dynamics to induce purchases might be not as effective in each single room. Suppose the web server has access to real time attendance in the rooms. This is achievable if it has real time or near real time access to the ticket sales at the front of the theatres. It presumably already has access to any electronic purchases of tickets. If the electronic tickets specify a given movie, but not a specific theatre location, then at the theatre entrances, customers with electronic tickets need to be scanned electronically and the results uploaded to the server.

The server can make a decision then, knowing the probable current attendances across all the rooms in the chain, and knowing the trailers to be shown in the rooms, to link the electronic screens together across certain rooms, showing the combined purchases. The rooms would be seeing all or mostly all of the same trailers.

The decision to link rooms seeing the same trailers might not be confined to only those rooms with low attendances.

A potential difficulty with deciding to link rooms based on attendance is that this might have to be predicted. People trickle into the rooms during the showing of the trailers. So total attendance often cannot be reliably known until the main movie starts. Hence the server might have heuristics based on various factors. These could include the known final attendance at the corresponding screening in a room on the previous day. For example, if we are looking at the 6 pm screening, the server consults the attendance at yesterday's 6 pm screening in the same room. This can be adjusted to account for the weekends (starting perhaps with Friday evening) having different attendance patterns from weekdays. And also to account for public holidays.

Another factor used in predicting could be the attendance in the immediate previous screening in the same room. Where this is separated into screenings in the matinees and those later in the day. Herb, a method might use the previous attendance as a predictor of the attendance in the current session. Or, a multiplier (greater or less than 1) could be applied to the previous attendance, to predict the current attendance. The multiplier could be constructed from a database of screen attendances.

Another factor might be the early attendance numbers for the current screening.

Several types of previous attendances could be used to predict the current attendance in a given room.

An alternative is where attendances are not used. A line for a movie in FIG. 2 could refer to all screens in that theatre building or all screens in the theatre chain currently showing that trailer, regardless of attendances in those rooms. This maximises the purchase numbers in FIG. 2.

If the screen in FIG. 2 shows purchases made across several rooms, then there could be some graphic indication on it telling the audiences that this is so.

For linking across rooms, this might be done even if the exact set of trailers shown between 2 rooms differs. The only requirement might be that the same trailer be shown in both rooms and in the same session, for the purchases to be totalled across both rooms and shown in their displays. Suppose in FIG. 2 that another room was only showing "Lost in Rabaul". Then in Screen 201 for the current room, the totals in that line could refer to both rooms, and some graphic indicator might appear on that line, to indicate that the collective buying for that movie spans several rooms.

This can be generalised to where each line in FIG. 3 can refer to joint purchasing across several rooms, and these other rooms can be different for each line.

Above, we described how the barcode and electronic screen on which it might appear could be on the side walls of the theatre. In addition to this, or instead, the barcode or table of FIG. 2 might appear on the projection screen. In this event, the barcode or table might appear between the showings of trailers, and before the main movie is shown.

4. Non-movie trailers;

Hitherto, we described only movie trailers being shown before the main movie. Other types of ads could be shown. These include public service announcements and well as for-profit ads. Either of these could have hyperlinks. But as mentioned earlier, it is cumbersome for a patron to manually transcribe those into her mobile device. Thus a barcode might appear on the main screen, or on the screens on the side walls, that encodes those links, as was done with the trailers.

Also, if a patron has a web page on her device that she got from earlier clicking on a barcode for a trailer, then several things could happen. First, suppose when the page was downloaded to her device, it had a list of all the trailers that were shown and will be shown. Near this list could be a link to another page showing links to the non-movie trailer ads. Or both pages could be combined. The latter might not be preferred by some designers, because it can clutter the main purpose of the page, which is to tell tickets to trailers.

Second, suppose when downloaded, the page only showed the current and perhaps previous trailers. It is possible using recent web browsers for the web server to automatically and periodically update this page. Hence assuming that the server knows accurately when a non-movie trailer ad appears, it can update the web page with text and a link to another page about the ad.

The use of non-movie trailers also creates the following possibility. The sequencing of movie trailers and non-movie trailers could be experimented with, to optimise the sale of movie trailer tickets. Perhaps having 2 sequential trailers could impact the sales of tickets to one or both. Imagine that the first trailer makes a good impression on a patron, who then goes to use the method of this submission to buy a ticket. She starts this after the trailer ends, because while the latter is playing she gave it her full attention. But the second trailer is also attractive to her. This could lessen her chances of completing the purchase of the ticket to the first trailer. Or if she places on hold the steps of the purchase and finishes these after the second trailer ends, it lessens the chance that she will buy a ticket to the latter. To some extent, this can be mitigated by the first trailer's web page being updated with a mention and link to the second trailer. But in general the chance of fratricide exists between trailers.

The theatre could insert a non-movie trailer between 2 movie trailers and test the purchase response of this versus having sequential movie trailers. It could test this in several rooms under varying conditions, like matinee or non-matinee sessions.

It might be objected that the theatre will not want non-trailers because its revenue is tied more closely to showing trailers. But if the theatre is planning to show a certain number of non-trailers, then where these appear vis a vis the trailers can be a design flexibility.

The use of non-movie trailers as interstitials between movie trailers might also be investigated for the case where a non-movie trailer has no associated barcode or link to its web page from a trailer web page. The intent is to reduce the chance that the patron will be distracted from buying a ticket if she could access a non-movie trailer web page. This can be tested in a way similar to the previous paragraph.

Another method when having sequential trailers is to have these for movies deemed likely to appeal to different audiences, to lower the risk of purchase interference. An action movie trailer might be succeeded by a trailer to a romance, as an example. Theatres probably already perform this to some extent. The novelty is that our submission lets them test and measure the efficacy of the orderings.

The use of the electronic screen in FIG. 2 can be extended further into when the main movie is shown. Hitherto, we only discussed this in the context of a barcode giving a web page where the patron could buy more tickets to a future screening of the main movie. Another barcode could be shown in FIG. 2, alongside any existing barcode or barcodes, or one of the latter could be altered. The new or altered barcode would offer a web page for some kind of synchronised interaction with the events of the main movie, different from the closed caption mentioned earlier. This could be a promotional tie-in with product placements in the movie, for example. A contest might be run by the studio, where perhaps when a patron saw a particular event in the movie, she pressed some button on her web page, as a task in the contest.

If a patron had earlier imaged a barcode in FIG. 2 that went to a page of trailer listings, then that page might have a link to the web page of the previous paragraph. It lets the patron avoid taking an image of the new or altered barcode. The latter barcode is still needed to be shown for patrons that did not image the earlier barcodes.

The dynamic group purchasing method of this section differs significantly from those used by, for example, Groupon Corp. or LivingSocial Corp. Those typically have users that are not in one location. The companies act as an aggregating intermediary between a set of users and a merchant. The users might have never been customers of the merchant. The (presumed) value of the companies is largely in their ability to gather users interested in a merchant's items. This has the effect of the merchant having to pay a large commission (sometimes 50%) to the intermediary for finding customers. In this submission, the theatre is the merchant. The users are already existing customers and are in one location and that location is the merchant.

The theatre can also install a WiFi server that services requests from patrons' wireless devices for Internet access. Some patrons might not have Internet access via their wireless providers. So to encourage the chance of a patron buying a ticket, the theatre has free WiFi access. This might be only for a very limited Internet use. Where any Internet destination address in an outgoing packet from a patron's device causes the WiFi server to return a default web page, that is just about buying a ticket. The server might parse the URL, so that the returned web page might be for a specific movie.

5. Mobile Electronic Billboard;

The methods can also be applied to contexts other than movie theatres. One defining characteristic of earlier sections was the trailers, which are ads for future events (movies). A generalisation is the ability to buy tickets for other types of future events. One context is a concert with live bands. There could be an electronic screen in the concert as per FIG. 2. Now the listings are for future concerts at this venue.

An extension is where the listings are for future concerts by a band, where these could be at different venues. Currently, if a patron likes the band currently playing (or that has just played), she has no simple automated means to even find out where the band will next be playing (assuming that it will do so). The state of the art consists of manual ad hoc steps, where she might ask for a flyer from the band listing future shows. She might then try to go online to the venues of those shows, to see if she can buy tickets. This is awkward for her, and limits the revenue to the bands and the venues.

Broadly our method can be used under the following conditions. There is a group of people in one location. Several, if not most, have mobile wireless devices (typically cellphones) currently serviced by one or more wireless networks. (These might be a cellphone provider and WiFi). The people can see each other and their surroundings. The surroundings have one or more electronic screens. On these are shown one or more barcodes. The barcodes encode URLs of web pages where items can be purchased electronically. The screens show purchases made by members in the group. The purchases might be at prices dependent on the number of purchases. Thus allowing dynamic group purchasing.

An example of a group of people in one location is people queuing to get into a stadium or building for some event, like a football game or night club or concert. Either before the doors are opened, or even when they are opened, many people might just be standing around or moving slowly. Nor is the current case restricted to people in a queue. They might be a crowd, with no internal queuing structure.

Another example is a bus or train station. Or inside a bus or train that is stationary or moving. Modern buses often have electronic screens showing news and ads. An adaptation of these to fit the mechanism of this submission is straightforward.

An important case of the electronic screens is when these are mobile electronic billboards. Consider a traditional mobile billboard. This typically has a hardcopy screen that is upright and stands on a trailer. The trailer is towed by a vehicle. One variant is where there are 2 hardcopy screens, back to back. Another variant is where the billboard is on the side or back of a truck. The billboard is thus mobile and can be towed around any event where there are crowds of pedestrians. An extension of the billboard functionality is where the screen is electronic, and the image can be changed by the computer that controls the screen, where this computer is part of the moving structure. We shall assume only one screen in the billboard. Two or more screens have the obvious generalisations.

The previous paragraph defines the state of the art. We extend it in the following ways. Suppose the billboard computer has a wireless connection to the Internet. Suppose the images it shows can be either one or more still images or a set of moving images, ie. video. In either case, the images can intermittently or continuously have a portion or entirety of the image in the form of a barcode. As per FIG. 1, this wraps an URL of a web server, which in turn can send control signals to the billboard computer. Forming a feedback loop when a pedestrian takes an image of the barcode and decodes it into an URL that her device browser shows.

Note that when we say 'control signals', this can be considered advisory. The billboard computer might take other inputs, perhaps from sensors it has, and it might use an internal random number generator, to produce the final images that it shows.

The web page of the URL could be an item or list of items that a person in the crowd, Jane, can buy with her device. When she does so, the billboard can indicate this in some manner. In this way she can influence the content of the billboard. The billboard might have a table listing items for sale, as per FIG. 2. Now the items are not restricted to the (important) special case of trailers shown in a theatre. The items could be any goods or services. In general, the items might be sold by third party retailers, who have made arrangements with the billboard owner to advertise their wares on the billboard.

The barcode URLs in FIGS. 1 and 2 are assumed to have the domain of the billboard's web server. This ensures that the billboard company can run the interactive table of FIG. 2 and get paid for any purchases.

An alternative mechanism is where an URL goes to a retailer's web server. The URL might have in it some substring that tells the latter server that it came from the billboard company and perhaps from a specific billboard. The billboard company might share the information about the billboard's location with the retailer. The retailer could credit the billboard company with a portion of any revenue made from sales.

The problem is the retailer might not fully do this.

A problem with the URL going directly to a retailer is that the dynamic group purchasing of the table in FIG. 2 becomes difficult to implement. This involves a repeated interaction between the web servers of the retailer and the billboard. The increased latencies this implies will reduce the overall response as seen by the users. Another aspect is that if each retailer has its own web server, there is an increased risk of bugs in one or more of those servers. In turn, this increases the risks to the billboard server if it fails to adequately detect errors in messages it gets from those servers.

The issues of the last 2 paragraphs lead us to recommend that the preferred implementation is where the URL goes to the billboard's web server. Analogous to how Google Corp.'s ad links on its search pages go directly to a Google server.

If the billboard has a table of items for sale as per FIG. 2, then this could show the current number of purchases by the crowd in front of the billboard. As in earlier sections, this is a major feature of the submission. It permits social dynamics. Having the table publicly viewable acts in large part as encouragement to bystanders who have not (yet) imaged the barcode to do so and make a purchase.

There could be more than one billboard at or around the current location. If this is a big crowd, a single billboard might not be viewable by many, so multiple mobile billboards might be used. There might also be permanently fixed billboards used by the billboard company. In general, the web server is the same for all these billboards. For performance reasons, the web server would preferably be located in the same city as the billboards.

The organisation that owns the billboards might have these in several cities. There might be a parent web server that gets all the queries from people near billboards at different cities. This could delegate the queries down to web servers in each city.

The table showing purchases might be of total purchases made at several billboards. As in earlier sections, the item price could be a function of the number of purchases. By letting the item price fall as a function of purchase thresholds, we can create a dynamic group purchasing behaviour.

A billboard might show both the table and images of one or more items at the same time. Or it might alternate between showing items for sale and the table of sales. The barcode that lets new users get the relevant web page appears continuously or intermittently.

In general, each billboard has a different barcode/URL from another billboard, if several billboards are being jointly used. This lets the web server tell which requests from users are associated with each billboard. This is also useful in a post-event analysis. Especially in deciding which locations of billboards were most desirable in terms of sales.

We described most of the billboards as mobile. But they might be moved to various locations near or in the crowd and then kept stationary for some time. The coordinates of these locations might preferably be recorded by the web server using, say, GPS coordinates of the locations if these can be found from sensors on the billboard or its vehicle.

One difference of our billboard from current billboards is that the latter are mostly moving. In order to show their images to as large an audience as possible. But this is possible also because intrinsically the current images are analysed by human brains (wetware), as opposed to also or in part being imaged by a machine in order to decode a barcode, which is our case. Our billboard moves, but is mostly stationary. In order to permit the latter actions by persons and their devices. Specifically, it is much easier for a pedestrian to focus her device camera onto a stationary barcode than a moving barcode. But our stationary billboard also allows for a social or collective dynamic group feedback effect.

Another difference is that our billboard might have a protective cover, because of the cost of the large electronic screen. Otherwise when the billboard is moving, gravel and other objects thrown up from the road might damage the screen. The cover could be transparent or opaque. If opaque, it would be removed when the billboard is at a stationary location.

When we described theatres, we said each session could have its own unique URL for more informative analysis. Likewise if a billboard were to move to a new location, it could (or should) have a new URL. And the server should record the mapping of the new URL to the new location. Users at an earlier location who bookmarked an earlier URL might be able to still make purchases via it. But it is the usefulness of being able to distinguish those from purchases at the new location that implies a new URL.

Also when a billboard is at a location, its barcode/URL might change over time. The web server could break the time the billboard is there into various time slices and allocate a unique barcode to each. This could aid analysis of time dependent usages of the associated URLs.

When our billboard is stationary, its Internet connection might be via a wired method at those locations. There might be a stationary Internet wall plug in a building near the billboard, to which it could connect.

People near a billboard with suitable mobile devices can pick a way to see the list of items for sale, if various ways are pre-defined by the billboard and web server. The picking of one of these ways by a person would be via her device, which shows a web page from the web server, giving these choices. One way might be by price, rising or falling. Or by the number of purchases, rising or falling. The server can then find the most popular way suggested by the billboard's users and then tell the billboard to display in such a manner. This manner can be for a default time, to allow for some stability in the table presentation. The links in the web pages have data encoded in them that tells the server which billboard is being referred to. Hence different billboards servicing the same crowd can have different listing ways.

If over some pre-set interval of time, the volume of purchases at a billboard falls below some pre-set amount, then the billboard might be moved to another location. There could be other criteria for moving. The decision could be implemented in both the web server and at each billboard. Hence, a second suggested role for the web server is to have decision logic advising a human administrator at the server, about when to move a billboard and where to move it to. This lets the web server have other methods to search for global optimal placements, where global refers to all the billboards. There could be logic implemented in each billboard that takes the server's suggestions and combines this with data from any sensors the billboard has. Importantly, the human driver of the billboard would then use this in conjunction with any local issues, like traffic congestion and crowd safety, to make the final decision to move the billboard and where to move it to.

Various retailers might pay or otherwise ask the billboard company to place a billboard at a location during an event, and also to list items for sale by those retailers. The billboard company might deliberately restrict the number of items for sale at any billboard. In part, having a relatively few items means that the group dynamics of people seeing existing purchases is easier to display and thus it is easier to try to amplify the amounts of those purchases.

Because there might be this restriction, then for a given location there could be value for a retailer in having its items listed there. The billboard company might have an electronic auction on its website, where retailers bid for the right to have their items listed at various locations. Similar to how a search engine might let advertisers bid for a limited number of ad locations associated with a search term.

Instead or in addition to selling items, the billboard might be used for promotional purposes. Like giving away items. For example, once a user decodes the barcode on the billboard screen, on the user's browser, she sees an URL (and associated text) that lets her download a purely electronic item, like a song or image. Or for physical items, available at some store, she might download to her device a voucher for those items.

The billboard can also be used for bystanders to play single player or multiplayer games. A game barcode could be shown on the billboard, perhaps with associated text explaining this. When a bystander images and decodes it, the web page on her device shows the controls for a game. It might show the entire game, or the main game board might be the billboard. Even if the web page shows the entire game, this could be also shown, perhaps with some modifications, on the billboard. The attraction could be in large part the audience that watches the game. During the game, ads-could be shown on the billboard. The games might be free for the players, or they might have to pay.

If the locations and route that a billboard will take is known in advance, it can be publicised on the web site. This could be in a programmatic or structured form, so a visitor can download the time and locations. The locations might be described by some common geocode method. Hence a visitor to the website who uses a mobile device to do so might have attendant software on the device (or the device can use remote software) to devise a route from the visitor's current location to the present or future location of the billboard.

Even if the locations and route are not known in advance, the web site could publish the current locations of all its billboards in the manner of the previous paragraph.

Our description of the mobile billboard does not preclude it from having other sensors and other means of interacting with people with mobile devices. For example, the billboard could have a Bluetooth transceiver that broadcasts messages containing offers to those devices able to receive Bluetooth signals. What we described earlier is a minimal hardware configuration.

Suppose the company running the billboards does so at various events in a city. By various publicity means, it could describe that if a user goes to its website, she can enter the time and location where she wants to see a billboard. The location could be in various formats readable by the web server. One variant is where a user with a mobile device at some location, and where the device knows its location, can tell the device to go to the website and upload the device's location, to tell the website to send a billboard to that location. The website can use this to estimate demand for locations.

A venue like a stadium now has the possibility of extracting extra revenue from its location when events are held. It could explicitly permit a billboard to be placed in an outside area of its premises, and charge the billboard company for that access. Like how a shopping mall rents outdoor kiosks to independent vendors.

The billboard company or the owners of locations where the billboards go might impose restrictions on the type of ads shown. There could be a blacklist of prohibited ads or a whitelist of approved ads. The prohibition or approval could be at one or more of various levels. At the level of a type of retailer would be the broadest scope. For example, a high school might want to ban ads from alcohol companies. A finer grained scope would be specific retailers. Then perhaps a scope of specific items.

6. Closed Captions;

Suppose the video on the theatre screen has an associated text channel. This text might be closed caption (subtitle) information associated with that video. Mostly the information would be the written form of spoken audio associated with the video. But it could include information about other aspects of the video.

Suppose Barcode 104 in FIG. 1 represents such a text channel. As earlier, Jane 101 uses her Device 102 to take an image of Barcode 104. The latter encodes an URL that goes to Web Server 105.

The URL contains information to the right of the domain name that tells the web server which theatre screen Jane is at.

When the web server gets a query from Device 102, it returns with a web page. On Device 102, this will show closed captions. Or Barcode 104 wraps an URL that returns a web page to Device 102, from which Jane can pick one or more of several options. One of these plays audio on her device. Another shows closed captions.

In the United States and some other countries, currently closed captions are not required to be shown on the movie screen. Presumably because this is considered distracting to most of the audience. Various specialised hardware solutions have been implemented in some theatres. Typically these are expensive, in part because they need to be fitted into or near every seat, or at least every seat in some portion of the theatre.

Our submission offers a simpler, cheaper alternative. It uses the prevalence of existing mobile devices, principally cellphones. This also has the advantage that what is shown on the device display typically cannot be seen by even adjacent neighbours of the person using our system. So it does not interfere with their viewing.

One possible drawback of our system is that the device display might not be visually close in the user's field of view to the theatre screen. An answer is the use of a lightweight (and cheap) mounting attached to the cup holder that is often part of a movie seat. Or perhaps attached to another portion of the seat, or to or near the back of the seat in front of the user. The mounting can hold the user's device. She can adjust the mounting so that the device display is near the image of the theatre screen. (Cf. The wikipedia entry on 'Closed captioning'.) This differs from the state of the art solution that uses a custom electronic display mounted on the cup holder. Our system is cheaper to the movie theatre than it having to purchase and maintain those custom displays.

A variant on the above is where Jane's mobile device includes glasses worn by her that can show text. The glasses are a Heads Up Display. If the device has wireless Internet access, and can show a web page, or portions thereof, overlaid on her vision, then via the above barcode, this system can show closed captioning. This differs from the state of the art for theatres. In part because the latter implementations of wireless glasses do not image a barcode that is an URL to a closed caption web page or channel. Also because this does not involve the theatre having to provide the glasses.

The theatre might before or at the start of the movie, show the above barcode on its screen, with an explanation of its usage, to let patrons know of and use this system.

Instead of or in addition to that, the barcode might also be shown on a hardcopy or electronic display that is not the main theatre screen. This display might be on the left or right walls of the room, so that it does not interfere with the viewing of the main screen. In one configuration, the barcode might appear on or attached to the back of the seat in front of the patron. The barcode might be illuminated in some manner so that it can be imaged by Jane's device, even when the theatre is dimmed. Preferably, the display would be visible during the playing of the movie. There could be several such displays. Unlike the previous paragraph, this lets Jane access the closed captioning after the movie has started.

There could be several closed caption channels. Each might be a translation in a different language. This leads to another implementation. Jane can take a closed caption channel on her device and input it into a Text To Speech (TTS) program. The latter takes input in the language of that channel and outputs audio in that language. The TTS program might be physically resident in her device. Or her device might access it wirelessly, sending it the text and obtaining the audio as the reply, which her device then plays.

If there are multiple channels (text feeds), then Jane can show several of these simultaneously on her device, subject to space restrictions on its display. One reason might be if she is unfamiliar with the main language being spoken in the movie. She might use 2 text feeds—one in that language and one in her native language—to improve her learning. It is known in language teaching that having multiple modalities of information being offered to a student improves learning and retention. Here, there are 4 modalities—the visual and audio of the movie, and the 2 text feeds.

This use of TTS is not limited to the context of a movie theatre. It could be used wherever Jane is near an electronic screen showing video with accompanying closed caption signals.

An extension is where Jane takes a closed caption channel in one language, as accessed via the above barcode. She sends it into a Machine Translation program, where this could be on her device or remotely accessed. The output would be in a language she specifies. The output is sent into a TTS program (local or remote) and then played on her device.

7. Extensions;

In the above sections, we described the extensive use of a barcode on an electronic screen. Where the barcode wrapped an URL of the web server that also controls the screen, and where the barcode was imaged by a user's mobile device. In the context of this submission, the screen might have other means by which the mobile device could easily get that URL. This might be via some other wireless modality, where the screen has a transmitter and the device has a receiver in the wavelength range of that modality.

The use of the barcode is not meant to be exclusive of these other means.

Also, one difference between this submission and our earlier submissions, especially "782" is that in the current submission, the screen might be accessible to physical interaction (like touching) by a user. The main context of the screen being in a theatre means that the theatre has employees (ushers) that can largely protect the screen from vandalism. Likewise, if the screen is a mobile electronic billboard, this has the driver of the vehicle, and possibly other employees, nearby. Whereas "782" treated the general case where, for example, there might be no employees nearby. Hence in "782", the screen needed to be out of reach of users, to prevent damage to it.

So in the current submission, one interaction could be via Near Field Communication, or another equivalent method, where the user moves her device close (centimeter distances say) to the screen or to its boundary. In doing so, the device can read data from the screen, including the URL that was earlier obtained via imaging a barcode.

I claim:

1. A method of selling movie tickets, comprising:
   displaying a barcode in a theatre, visible by patrons, the barcode comprising an encoded uniform resource locator (URL) of a webpage, wherein the displaying the barcode is displayed on an electronic screen;
   imaging and decoding the barcode with a mobile device connectable with the Internet;
   opening a browser with the mobile device, wherein the browser displays the webpage according to the URL;
   via the webpage, selling tickets to movies depicted in movie trailers shown on the electronic screen in the theatre,
   displaying results of tickets sold to the movies depicted in the movie trailers as a consequence of the movie trailers shown in the theatre;
   lowering ticket prices if the number of tickets sold as a consequence of the movie trailers shown in the theatre is greater than a threshold number; and
   displaying the threshold number and current number of tickets sold as a consequence of the movie trailers shown in the theatre on the electronic screen.

2. The method of claim 1, further comprising: displaying the barcode in one or more theatres, wherein each of the one or more theatres shows a same movie trailer.

3. The method of claim 1, further comprising: varying a plurality of movie trailers across the one or more theatres and/or across different movie sessions, thus maximizing revenue from ticket sales.

4. The method of claim 3, further comprising: playing a plurality of non-movie trailers in addition to the plurality of movie trailers, the one or more theatres varying an order of the plurality of non-movie trailers with the plurality of movie trailers, thus maximizing revenue from ticket sales.

5. The method of claim 1, wherein the threshold number varies as a function of an estimated number of patrons currently in attendance in the theatre, and/or a function of an estimated number of patrons previously attended in the theatre.

6. The method of claim 1, wherein the barcode is displayed either before a movie is shown in the theatre or after the movie is shown in the theatre, wherein the ticket prices after the movie is shown are different from the ticket prices before the movie is shown.

7. The method of claim 1, further comprising:
   determining a most revenue generating movie trailer by showing a plurality of different movie trailers in a plurality of theatres across a plurality of screenings; and
   showing the most revenue generating movie trailer in future screenings.

8. The method of claim 7, further comprising:
   providing results pertaining to the most revenue generating movie trailer to movie studios; and
   finalizing, by the movie studios, movies according to the results provided.

9. A method comprising:
   displaying a barcode encoded with a uniform resource locator (URL) on an electronic display, the electronic display being connectable with the Internet;
   imaging and decoding the barcode with the mobile device connectable with the Internet;
   retrieving a webpage associated with the URL from a web server and displaying the webpage on the mobile device;
   sending, by the web server, a signal to the electronic display, wherein the signal is adapted to alter an image displayed on the electronic display;

selling one or more movie tickets, via the webpage, to movies depicted in a movie trailer shown on the electronic display;

displaying results of the one or more movie tickets sold as a consequence of the movie trailers shown in the theatre to a plurality of users on the electronic display;

adjusting prices of the one or more movie tickets as a function of a number of movie tickets sold as a consequence of the movie trailers shown in the theatre, wherein if the number is greater than a threshold, a price of the one or more movie tickets are lowered; and displaying the threshold and current number of the one or more movie tickets sold on the electronic display.

10. The method of claim 9, wherein the electronic display is part of a billboard.

11. The method of claim 10, wherein the billboard is a mobile billboard.

12. The method of claim 9, wherein the billboard is at or near a location selected from the group consisting of: a bus station, a train station, a stadium, a sporting event and a night club.

13. The method of claim 9, wherein the web server comprises a blacklist of prohibited movie tickets from being displayed on the electronic display, wherein the blacklist of prohibited movie tickets is a function of a location of the electronic display.

14. The method of claim 9, wherein the web server comprises a blacklist of prohibited retailers from displaying products on the electronic display, wherein the blacklist of prohibited retailers is a function of a location of the electronic display.

15. The method of claim 9, wherein the electronic display is a plurality of electronic displays, wherein the results of purchases is an aggregate of the purchases across the plurality of electronic displays.

* * * * *